United States Patent [19]

Shu-Hwa

[11] Patent Number: 4,899,023
[45] Date of Patent: Feb. 6, 1990

[54] BICYCLE BRAKE LIGHT CONTROL SWITCH ASSEMBLY

[76] Inventor: Lee Shu-Hwa, 7F, 16, Alley 3, Lane 227, Nung-An St., Taipei, Taiwan

[21] Appl. No.: 310,786
[22] Filed: Feb. 14, 1989
[51] Int. Cl.[4] .............................................. H01H 3/16
[52] U.S. Cl. ................................ 200/61.12; 200/61.87
[58] Field of Search ............... 200/61.12, 61.87, 61.89, 200/543; 340/432

[56] References Cited

U.S. PATENT DOCUMENTS

| | | | |
|---|---|---|---|
| 3,521,233 | 7/1970 | Inoue | 200/61.89 X |
| 3,703,620 | 11/1972 | Watanabe | 200/61.89 X |
| 3,870,846 | 3/1975 | Filip | 200/543 |
| 4,031,343 | 6/1977 | Sopko | 200/61.12 |

Primary Examiner—J. R. Scott
Attorney, Agent, or Firm—Ladas & Parry

[57] ABSTRACT

This invention relates to a bicycle brake light switch control assembly for use to mount on most of all types of bicycle brakes to control turning on/off of an associated bicycle brake light in accordance with the operation of the associated bicycle brake. Upon applying the brakes of a bicycle, brake cables are contracted, forcing a sliding sleeve of the invention to displace further into a socket. This causes two conductive plate springs to come into contact with a conductive tube, thereby completing an electric circuit and inducing the brake light to turn on. When the brake is released, springing means forces the sliding sleeve to displace to its original position. This drives the two conductive plate springs away from contact with the conductive tube. This breaks the electric circuit and the brake light turns off. The sliding sleeve contains two water-proof retainer rings to permit the invention to operate in wet conditions.

7 Claims, 7 Drawing Sheets

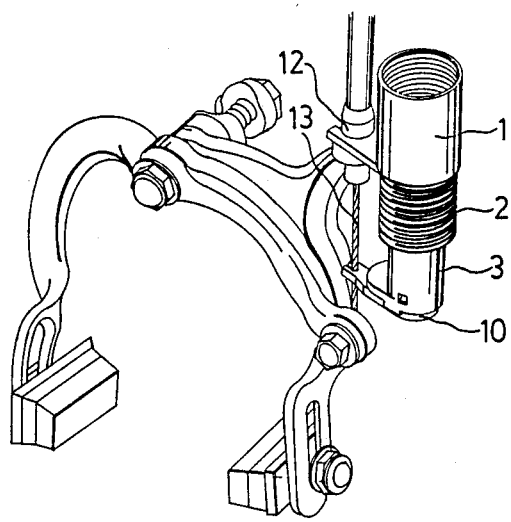
F I G. 5

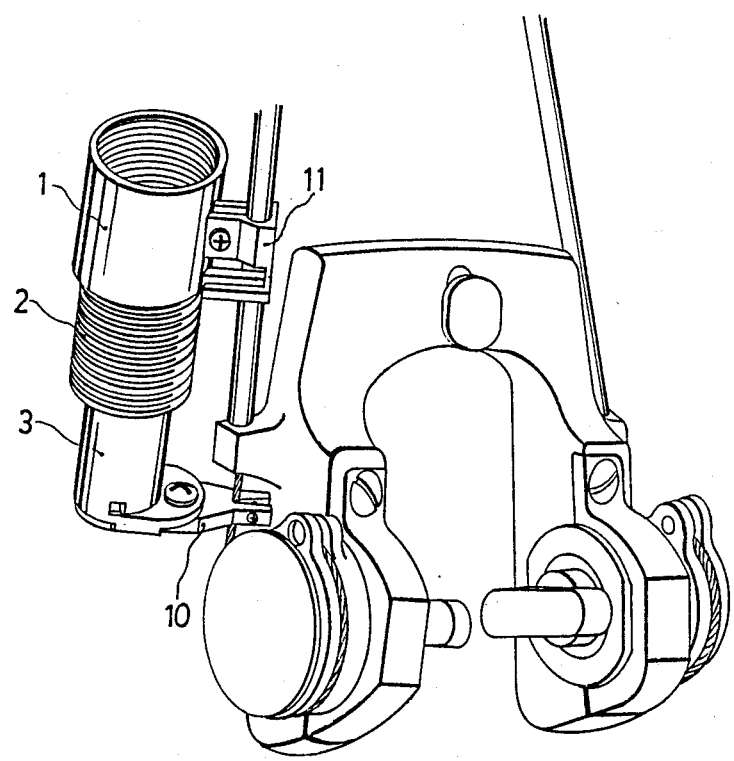
F I G. 7

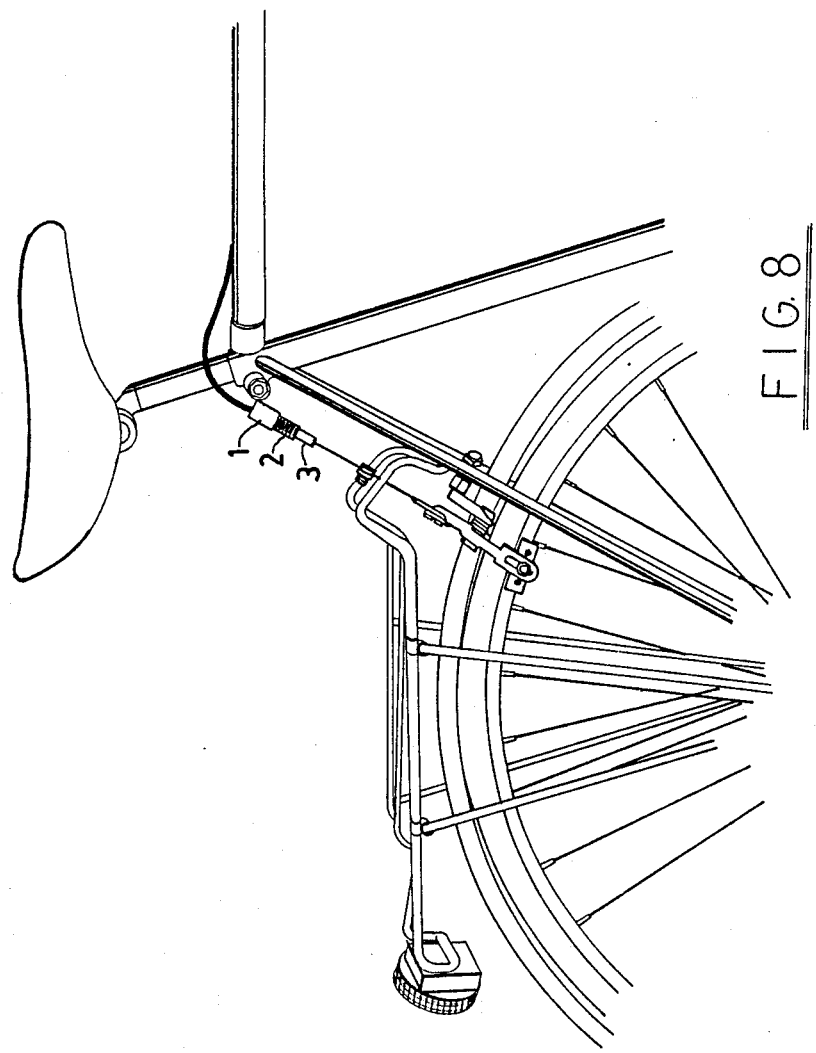

BICYCLE BRAKE LIGHT CONTROL SWITCH ASSEMBLY

BACKGROUND OF THE INVENTION

Bicycle has been used as a transportation vehicle since it was created. In recent years in advanced countries, in order to save energy, many people would take a bicycle for short range traveling instead of a motorized transportation vehicle. And at the present time, bicycle is also mainly used as an outdoor sports activity.

Although bicycle is widely used in all countries by all people, there is still few criterion regarding safety riding of a bicycle. Following the fast development in technology, bicycle is designed to become more compact and light. However, there is little change on stop warning system. Although there are various kinds of bicycle tail lamps been commercialized, or various kinds of light reflector pads been used to stick to the tail portion of a bicycle, these bicycle tail lamps or light reflector pads just give a signal to indicate where the bicycle is, and they are not applicable to simultaneously show a braking situation. Further, few countries had ever paid attention to guiding the people in riding a bicycle. More particularly to those young people or children, they may have little common sense pertaining traffic regulations. Because a bicycle has nothing to protect the rider, it is indeed dangerous to ride a bicycle in the night. Since a bicycle is very light and its speed is slow, while riding on a road, it may be attacked by a fast passing motorcycle or motorcar from the back to cause accident. Therefore, it is one of the best methods to protect a bicycle rider to have a bicycle equipped a means to give a warning signal to the motorcycle or car drivers coming behind when to stop.

SUMMARY OF THE INVENTION

It is the scope of the present invention to provide a bicycle brake light control switch assembly to fit for all kinds of bicycle brakes.

The present invention is related to a bicycle brake light control switch assembly, which is water proof, and is adjustable to fit for most of all types of bicycles brakes.

The bicycle brake light control switch assembly is to be mounted on the brake of a bicycle with the housing be connected with the cable guide of the brake, with the sliding sleeve positioned beyond the stroke of the cable, with the inner socket be arranged to adjust the relative position and distance of the housing and the sliding sleeve, and with the conductive tube, insulator block, spring, conductive plate springs, power jacket, and cable clamp respectively connected together to form a stroke adjustable brake light switch control assembly.

BRIEF DESCRIPTION OF THE DRAWINGS

FIG. 5 is a schematic drawing of an embodiment of the present invention.
FIG. 7 is a schematic drawing of a third embodiment of the present invention.
FIG. 8 is a schematic drawing of a fourth embodiment of the present invention.

DESCRIPTION OF THE PREFERRED EMBODIMENT

Figure 1:
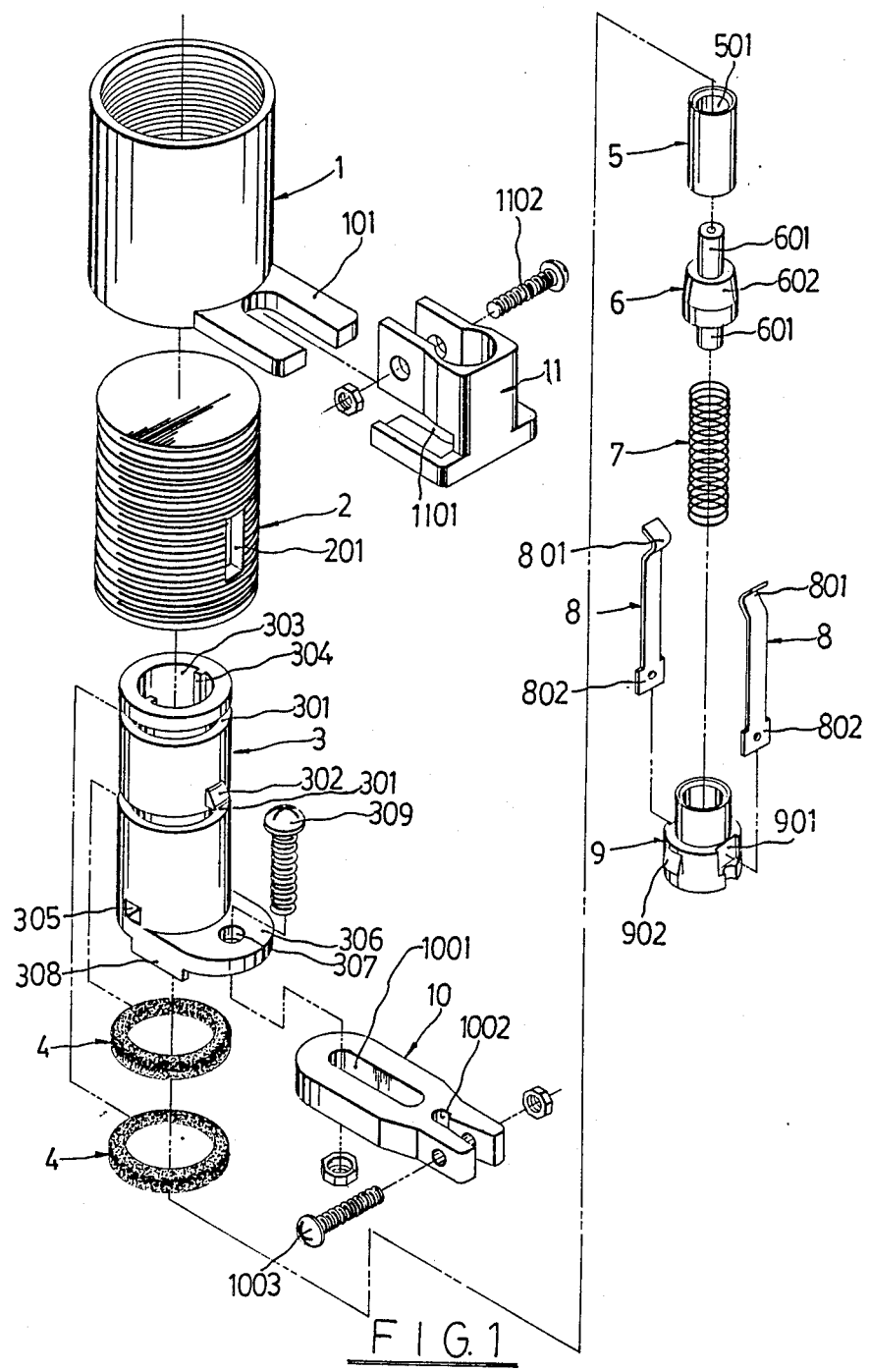
FIG. 1 is an exploded view of the present invention.

Referring to FIG. 1, a bicycle brake light control switch assembly includes a housing (1), socket (2), sliding sleeve (3), retainer rings (4), conductive tube (5), insulator block (6), spring (7), conductive plate springs (8), power jacket (9), cable clamp (10), and cable guide clamp (11).

Figure 3:
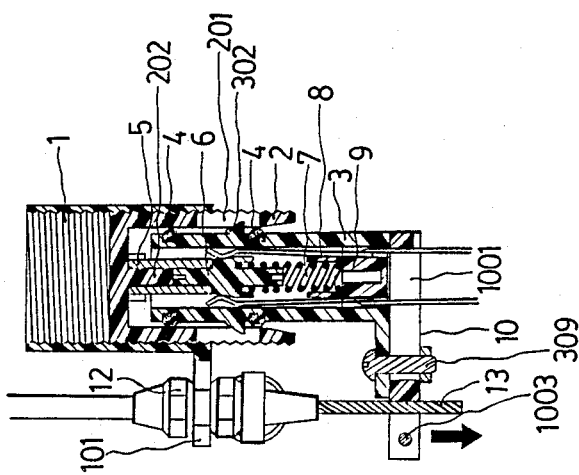
FIG. 3 is a sectional view of the present invention.

The housing (1) comprises a holder plate (101) to hold the cable guide (12) of a bicycle brake (refer to FIG. 3). The socket (2) is screwed into the housing (1) by means of screw joint, comprising one pair of elongated slots (201) respectively made on both side walls, and an inner post extended downward from the top (refer to FIG. 3).

The sliding sleeve (3) comprises two circular grooves (301) for mounting thereon of two water-proof retainer rings (4) respectively, to present from permeation of water into the assembly to deteriorate electric conduction quality or cause power short circuit, and comprises two locating holes (305) at the lower end for fixation of the power jacket (9). The sliding sleeve (3) is slidably set in the socket (2) with its two retainer noses (302) respectively set in the two elongated slots (201) of the socket (2). The sliding range of the sliding sleeve (3) inside the socket (2) is confined by the two elongated slots (201). The sliding sleeve (3) also comprises a holder plate (306) for holding the cable clamp (10), having a bolt hole (307) made on the holder plate (306) and having side wall plates (308) to guide and confine the position of the cable clamp (10). Two locating flanges (304) are made on the inner hole (303) of the sliding sleeve (3) to retain the inner component parts thereinside.

The power jacket (9) comprises two notches (901) at both sides for connection thereto of the two conductive plate springs (8) respectively. The conductive plate springs (8) each has a bent portion (801) at the top, and a connection (802) at the bottom end for connection with a respective power line. When in assembly, the conductive tube (5), the insulator block (6), the spring (7), the power jacket (9) are respectively set in proper sequence in the inner hole (303) of the sliding sleeve (3) to let the retainer noses (902) of the power jacket (9) be set in the locating holes (305) of the sliding sleeve (3) with the upper and bottom rods (601) of the insulator block (6) inserted into the inner hole (501) of the conductive tube (5) and the spring (7) respectively. The insulator block (6) has a tapered middle portion (602) to allow the bent portion (801) of each conductive plate spring (8) to vertically slide therealong.

The cable clamp (10) comprises an elongated slot (1001) to match with the cable clamp holder plate (306). A bolt (309) is provided to screw into the bolt hole (307) and the elongated slot (1001) to connect the cable clamp (10) with the holder plate (306) letting the cable clamp (10) be slidably adjusted its horizontal position against the cable (13). When the cable (13) is inserted into the cable hole (1002) of the cable clamp (10), it is clamped by means of a bolt (1003) (refer to FIG. 3).

Figure 6:
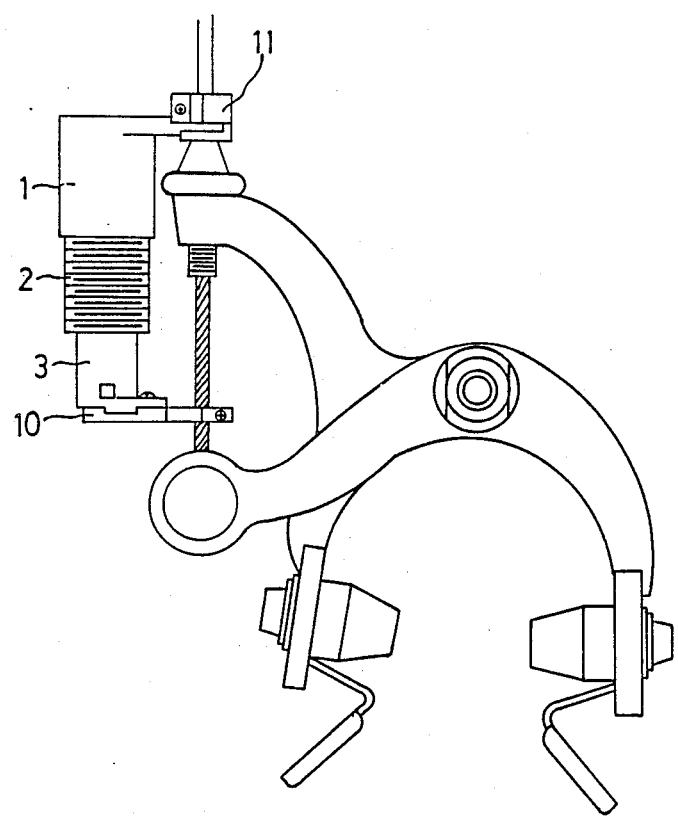
FIG. 6 is a schematic drawing of a second embodiment of the present invention.

The cable guide clamp (11) is provided to clamp the brake cable by means of a bolt (1102), which brake cable is not retained by a cable guide (12), and is mounted on the cable guide clamp holder plate (101) of the housing (1) by means of the groove (1101) (refer to FIGS. 6 and 7).

Figure 2:
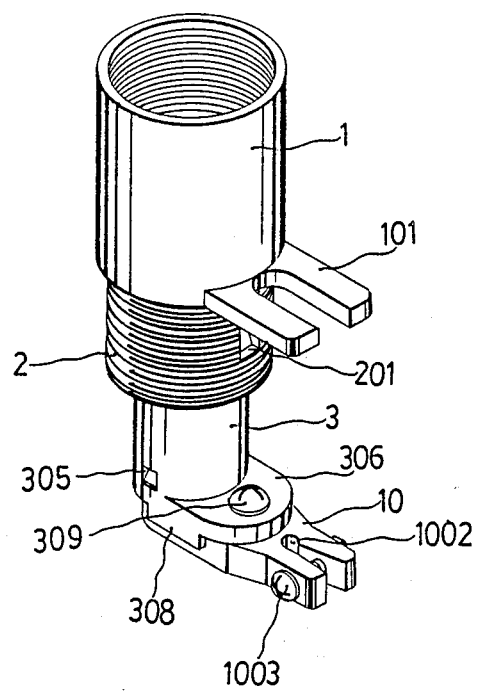
FIG. 2 is a perspective assembly view of the present invention.

The outer appearance of the whole assembly is as shown in FIG. 2, and its operation is as shown in FIG. 3. The cable guide (12) is fixedly attached to the holder plate (101) of the housing (1) by means of its adjusting screw. The cable (13) is firmly clamped by the cable clamp (10). At this moment, the two conductive plate springs (8) are not in contact with the conductive tube (5). Therefore, the circuit is off.

Figure 4:
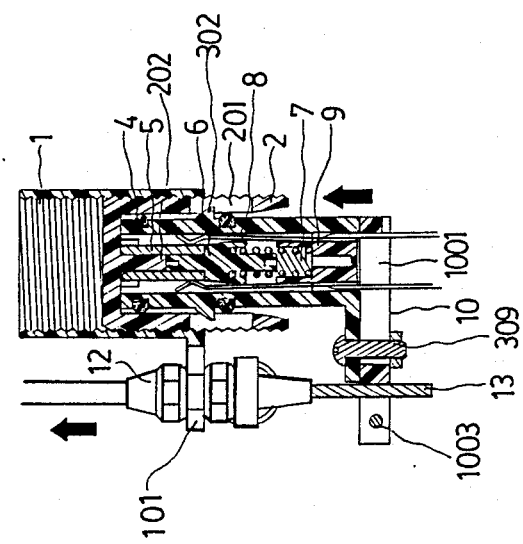
FIG. 4 is another sectional view of the present invention.

Referring to FIG. 4, while braking, the cable (13) is driven to force the sliding sleeve (3) to get into the socket (2) to further allow the two conductive plate springs (8) to become in contact with the conductive tube (5). Therefore, the circuit becomes on, and the brake light is turned on.

Because braking mechanisms come in a variety of structures, the attaching elements of the invention must be varied in order to adapt to those differing designs.

FIG. 5 illustrates the invention where the holder plate is attached to the brake mechanism by a cable guide.

FIG. 6 illustrates the invention as adapted to be used with a brake mechanism of a design than pictured in FIG. 5. Here a cable guide clamp is used.

FIG. 7 is another illustration of how the invention may be adapted to a brake mechanism of another design. Here the invention is attached to a length of brake cable by the use of the cable guide clamp.

FIG. 8 illustrates the complete wiring connection of the brake and the brake light in a full drawing including the bicycle.

I claim:

1. A bicycle brake light switch control assembly comprising:
    a housing having a holder plate and an inner thread configuration;
    a socket having an outer thread configuration engageable with said inner thread configuration, said socket having elongated slots on its side;
    a sliding sleeve having two circular grooves for mounting thereon two water-proof retainer rings, said sleeve further having a first inner hole therethrough, two locating holes, retainer noses for connection with said elongated slots, a cable clamp holder plate, said cable clamp holder plate having a bolt hole and side wall plates to guide and confine the position of a cable clamp, said sliding sleeve also having two locating flanges on said first inner hole for position allocation of a plurality of component parts;
    a conductive tube made of conductive metal and having a second inner hole;
    a spring;
    an insulator block having upper and bottom rods, said upper rod insertable into said second inner hole, said bottom rod insertable into said spring, said insulator block also having a tapered middle portion;
    a power jacket, said jacket having two notches, said jacket also having retainer noses for connecting with said locating holes of said sliding sleeve;
    two conductive plate springs, one mounted on each said notch, each conductive plate spring having a bent portion at one and a connection portion at the other end for connecting with a respective power line;
    a cable clamp mounted on said cable clamp holder plate, said cable clamp having an elongated slot for connecting said cable clamp to said holder plate with a bolt, said cable clamp also having a cable hole for securing said assembly to a brake cable with a bolt;
    a cable guide clamp having a groove, said cable guide clamp for connecting said cable guide clamp holder plate to a brake cable, wherein when brake is activated, the brake cable is driven to force said sliding sleeve away from an initial position and into said socket, causing said two conductive plate springs to contact with said conductive tube and thereby completing a circuit; when brake is released, said spring urges said sliding sleeve to return to said initial position and thereby causing said two conductive plate springs to no longer contact said conductive tube and breaking the circuit.

2. A bicycle brake light switch control assembly, said assembly comprising:
    a housing;
    means for securing said housing to a brake cable;
    a socket housed in said housing, said socket having first elongated slots;
    a sliding sleeve with a first inner hole therethrough, said sliding sleeve having locating holes and means for attaching said sliding sleeve to a brake cable;
    conductive means;
    insulating means;
    a power jacket, said jacket having retainer noses engageable with said locating holes, said jacket also having notches;
    conductive plate springs with a first end and a second end, said first ends disposed on said notches;
    springing means disposed between said power jacket and said insulating means, so that when said springing means is in an equilibrium state, said second end of said conductive plate springs is contiguous to said insulating means and an electric circuit is not completed, but when the bicycle brake is activated, the brake cable urges said sliding sleeve to displace which in turn causes power jacket to push said second end of said conductive plate springs onto said conductive means and completing the electric circuit.

3. An assembly as claimed in claim 2 wherein said housing has a bore therethrough and threads formed on said housing, said socket has threads fomed on its outer surface so that said socket is threadable into said housing.

4. An assembly as claimed in claim 2 wherein said sliding sleeve has two circular grooves formed on its outer surface so that water-proof retainer rings can be located around said grooves.

5. An assembly as claimed in claim 2 wherein said conductive means is comprised of a conductive tube with a second inner hole therethrough.

6. An assembly as claimed in claim 5 wherein said insulating means is comprised of an insulator block having upper and bottom rods, said upper rod insertable into said second inner hole, said bottom rod insertable into said springing means, said insulator block also having a tapered middle portion.

7. An assembly as claimed in claim 2 wherein said means for securing said housing to the brake cable comprises said housing having a holder plate and a cable guide clamp attachable to said holder plate.

* * * * *

UNITED STATES PATENT AND TRADEMARK OFFICE
CERTIFICATE OF CORRECTION

PATENT NO. : 4,899,023

DATED : February 6, 1990

INVENTOR(S) : Shu-Hwa Lee

It is certified that error appears in the above-identified patent and that said Letters Patent is hereby corrected as shown below:

On the title page, Item [76] the inventor's name should be corrected to read --SHU-HWA LEE--.

Signed and Sealed this

Twelfth Day of February, 1991

Attest:

HARRY F. MANBECK, JR.

*Attesting Officer*      *Commissioner of Patents and Trademarks*